United States Patent [19]
Boaz

[11] Patent Number: 5,656,053
[45] Date of Patent: Aug. 12, 1997

[54] METHOD FOR HEATING AND FORMING A GLASS SHEET

[75] Inventor: Premakaran Tucker Boaz, Livonia, Mich.

[73] Assignee: Ford Motor Company, Dearborn, Mich.

[21] Appl. No.: 524,495

[22] Filed: Sep. 7, 1995

[51] Int. Cl.$^6$ ................................................. C03B 23/02
[52] U.S. Cl. ..................... 65/106; 65/104; 65/111; 65/114; 219/678; 219/680
[58] Field of Search .................... 65/102, 104, 106, 65/107, 111, 114; 219/678, 680, 764, 773; 264/432, 489; 432/1, 11, 9, 18

[56] References Cited

U.S. PATENT DOCUMENTS

| | | |
|---|---|---|
| 2,145,119 | 1/1939 | Littleton . |
| 2,178,520 | 10/1939 | Howard . |
| 3,406,022 | 10/1968 | Gehenot . |
| 3,875,766 | 4/1975 | French . |
| 3,938,980 | 2/1976 | French . |
| 4,226,608 | 10/1980 | McKelvey . |
| 4,606,748 | 8/1986 | Blake et al. . |
| 4,773,925 | 9/1988 | Schultz . |
| 4,838,915 | 6/1989 | Hässler . |
| 5,306,324 | 4/1994 | Vehmas et al. . |
| 5,324,345 | 6/1994 | Rutjes et al. . |
| 5,352,263 | 10/1994 | Kuster et al. . |

FOREIGN PATENT DOCUMENTS 1680646  9/1991  U.S.S.R. .

OTHER PUBLICATIONS

Robert Gardon, "The Tempering of Flat Glass By Forced Convection", pp. 1–33.
Robert Gardon, "Calculation of Temperature Distributions in Glass Plates Undergoing Heat-Treatment", Jun. 1958, pp. 200–209.

Primary Examiner—Steven P. Griffin
Attorney, Agent, or Firm—Lorraine S. Melotik, Esq.; Roger L. May, Esq.

[57] ABSTRACT

A method for heating and forming a glass sheet includes the steps of heating a glass sheet to at least a first predetermined temperature, applying microwave energy to the glass sheet to heat the glass sheet to at least a second predetermined temperature, cooling an outer surface of the glass sheet to at least a third predetermined temperature and forming the glass sheet using forming rollers to a predetermined configuration.

20 Claims, 2 Drawing Sheets

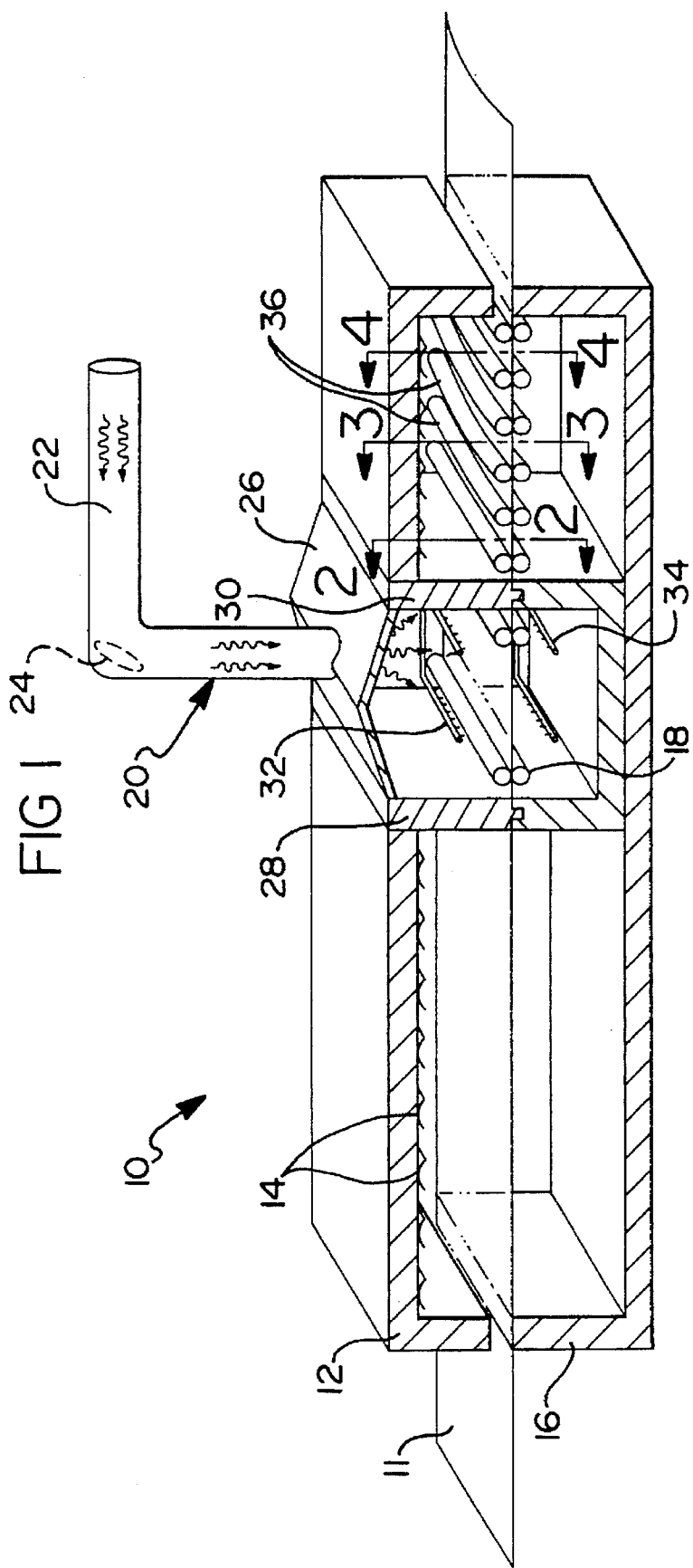

5,656,053

METHOD FOR HEATING AND FORMING A GLASS SHEET

GOVERNMENT RIGHTS IN INVENTION

The U.S. Government has rights in the present invention as provided for by the terms of Contract No. IPO-95-10043-003 awarded by the Department of Energy.

CROSS-REFERENCES TO RELATED APPLICATIONS

The present application is related to Ser. No. 08/524,500, filed Sep. 7, 1995 and entitled "METHOD FOR HEATING A GLASS SHEET" and Ser. No. 08/524,493, filed Sep. 7, 1995 and entitled "METHOD FOR HEATING, FORMING AND TEMPERING A GLASS SHEET".

BACKGROUND OF THE INVENTION

1. Field of the Invention

The present invention relates generally to glass sheets and, more specifically, to a method for heating and forming a glass sheet.

2. Description of the Related Art

It is known to heat glass sheets using a "hearth" or "lehr". Generally, the lehr is a furnace and may be of a continuous roller-type, fixtured roller-type or gas-type. For example, a roller-type lehr has a plurality of rollers disposed beneath a plurality of radiant heaters. Typically, a glass sheet is placed inside the lehr where it is heated by conventional radiation, convection and conduction heat. The glass sheet is moved along the rollers at a predetermined rate which depends on the thermal conductivity of the glass sheet to reach a temperature in its forming range. When the glass sheet is at a temperature in its forming range, the heated glass sheet is formed to a predetermined configuration using a plurality of forming rollers to bend the glass sheet to a desired curvature. Once formed, the glass sheet is either quenched, annealed or tempered.

Although the above lehr and forming rollers have worked well to heat and form a glass sheet, they suffer from the disadvantage that the lehr must be long in length to allow the glass sheet to be heated at the predetermined rate. They also suffer from the disadvantage that the process capability is limited due to heating the glass sheet with only radiant heat. They further suffer from the disadvantage that the forming rollers are limited to a single radius capability at a time. As a result, there is a need in the art to heat a glass sheet quickly in a controlled manner and to form the glass to a predetermined configuration using forming rollers.

SUMMARY OF THE INVENTION

Accordingly, the present invention is a method for heating and forming a glass sheet. The method includes the steps of heating a glass sheet to at least a first predetermined temperature and applying microwave energy to the glass sheet to heat the glass sheet to at least a second predetermined temperature. The method also includes the steps of cooling an outer surface of the glass sheet to at least a third predetermined temperature and forming the glass sheet using forming rollers to a predetermined configuration.

One advantage of the present invention is that an improved method is provided for heating and forming a glass sheet. Another advantage of the present invention is that the method uses microwave energy to heat the glass sheet quickly at or above its softening point. Yet another advantage of the present invention is that the method uses pinch rollers to form the glass sheet to a desired curvature. Still another advantage of the present invention is that the method uses a series of sleeved pinch rollers of different radii to form the glass sheet to a desired curvature. A further advantage of the present invention is that the method allows for heating and cooling of the glass sheet at the same time. Yet a further advantage of the present invention is that the method reduces the length of the lehr, resulting in less floor space and increased throughput (speed and yield) of glass sheets formed.

Other features and advantages of the present invention will be readily appreciated as the same becomes better understood after reading the subsequent description taken in conjunction with the accompanying drawings.

BRIEF DESCRIPTION OF THE DRAWINGS

FIG. 1 is a fragmentary perspective view of a lehr used in conjunction with a method for heating and forming a glass sheet, according to the present invention.

FIG. 2 is a sectional view taken along line 2—2 of FIG. 1.

FIG. 3 is a sectional view taken along line 3—3 of FIG. 1.

FIG. 4 is a sectional view taken along line 4—4 of FIG. 1.

DESCRIPTION OF THE PREFERRED EMBODIMENT(S)

Figure 5:
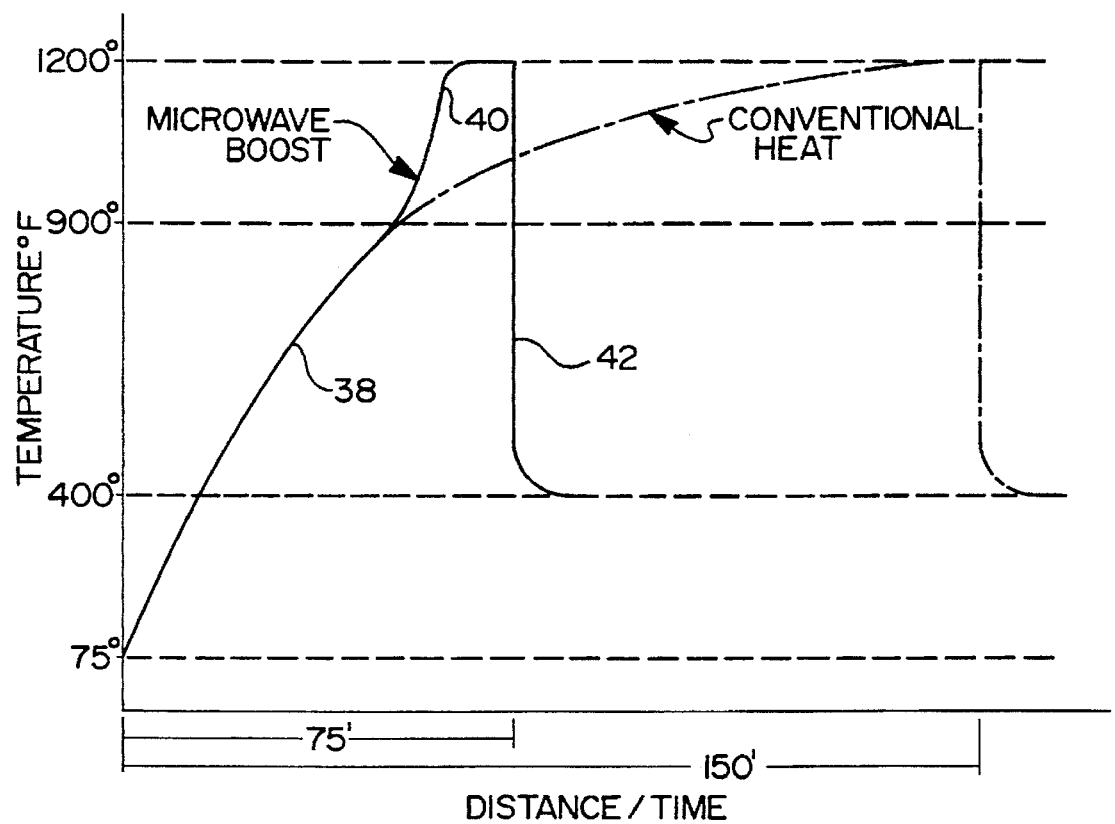
FIG. 5 is a graph of temperature versus rate of a glass sheet heated by a method for heating and forming a glass sheet, according to the present invention.

Referring to the drawings and in particular to FIG. 1, one embodiment of a lehr 10 for use in conjunction with a method for heating and forming a glass templet or sheet 11, according to the present invention, is shown. As illustrated, the lehr 10 is of a roller-type continuous furnace.

The lehr 10 includes an upper housing 12 extending longitudinally and having a plurality of heaters 14 spaced longitudinally therealong. The heaters 14 are of the radiant type as is known in the art. The lehr 10 also includes a lower housing 16 extending longitudinally and having a plurality of rollers 18 disposed longitudinally therealong. It should be appreciated that the glass sheet 11 is moved by the rollers 18 as is known in the art. It should also be appreciated that, up to this point in the description, the lehr 10 is conventional and known in the art.

Referring to FIG. 1, the lehr 10 includes a microwave energy apparatus, generally indicated at 20, disposed at a position along the length of the lehr 10. The microwave energy apparatus 20, partially shown, includes a conduit 22 extending longitudinally and having a reflector 24 in a corner thereof to direct microwave energy through a downward portion of the conduit 22. The microwave energy apparatus 20 includes a shield 26 at one end of the conduit 22 to columnate the microwave energy and form a transverse curtain of microwave energy (e.g. six inches) toward the rollers 18. The microwave energy apparatus 20 is a self-contained unit having a microwave energy frequency of two (2) to forty (40) gigahertz. Preferably, the frequency of the microwave energy is less than thirty-six (36) gigahertz. The lehr 10 includes uplift doors 28 and 30 on each longitudinal end of the shield 26 to allow entry and exit of the glass sheet 11 into a contained area for the microwave energy. The lehr 10 also includes air blowers 32 and 34 above and below the rollers 18 and disposed in the area between the uplift doors 28 and 30. The air blowers 32 and 34 are arranged in two rows to direct cooling air toward the glass sheet 11. It should be appreciated that the microwave energy apparatus 20 is a Gyrotron type commercially available from Continental Electronics of Dallas, Tex. It should further be appreciated that a temperature measuring device is used to measure the temperature of the glass sheet 11 which is conventional and known in the art.

The lehr 10 further includes a plurality of forming rollers 36 for forming the heated glass sheet 11 to a predetermined configuration. The forming rollers 36 are sleeved pinch rollers as is known in the art. As illustrated in FIGS. 2 through 4, the forming rollers 36 include a plurality of first radius rollers 36a, second radius rollers 36b and third radius rollers 36c having a curvature of varying degree to form the glass sheet 11 to a predetermined curvature as is known in the art. For example, the first radius rollers 36a have a one hundred eight (108) inch radius, the second radius rollers 36b have a ninety (90) inch radius and the third radius rollers 36c have a fifty (50) inch radius. It should be appreciated that in one pair of rollers 36, one roller is fixed and the other roller is adjusted relative to it. It should also be appreciated that the smallest radius forming roller 36 is farthest downsteam.

In operation, the lehr 10 may be used to form the glass sheet 11 as a windshield or door glass for a motor vehicle (not shown) by a method, according to the present invention. The method includes placing a flat or planar glass sheet 11 on the rollers 18 at one end of the lehr 10. The method includes moving the glass sheet 11 along the rollers 18 at a predetermined rate and heating the glass sheet 11 to a predetermined temperature with the heaters 14. For example, the glass sheet 11 is heated by the heaters 14 using an ambient heat of over 1400° F. as the glass sheet 11 travels a certain distance over time to heat the glass sheet 11 to a predetermined temperature. In one embodiment, the predetermined temperature is the softening point of the glass sheet 11 which is approximately 900° F. to 950° F. As illustrated in FIG. 5, a curve 38 represents the temperature of the glass sheet 11 as it moves over distance/time through the lehr 10 as is known in the art.

When the glass sheet 11 is at its softening point, the glass sheet 11 is disposed between the uplift doors 28 and 30. The method includes applying microwave energy to the glass sheet 11 when the glass sheet 11 is at or above its softening point as represented by the curve 40 as illustrated in FIG. 5. The method includes moving the glass sheet 11 at a predetermined rate under the curtain of the microwave energy columnated by the shield 26 and rapidly heating the glass sheet 11 with the microwave energy to a predetermined temperature. In one embodiment, the predetermined temperature of the glass sheet 11 is its forming range of approximately 1150° F. to 1250° F. For example, the temperature of the glass sheet 11 can be raised from 900° F. to over 1200° F. in less than ten (10) seconds as illustrated in FIG. 5. The microwave energy heats the glass sheet 11 directly by generating heat at the molecular level by creating polar orientation movement very rapidly resulting in instantaneous and uniform heating through the thickness of the glass sheet 11. The method also includes cooling an outer surface of the glass sheet 11 to at least a third predetermined temperature of approximately 900° F. simultaneously while applying the microwave energy. For example, air is blown at the glass sheet 11 by the air blowers 32 and 34 to give the glass sheet 11 a cool hard skin such that the outer surfaces of the glass sheet 11 will not be marked by the forming rollers 36 while the inside of the glass sheet 11 is in its forming range. It should be appreciated that if the glass sheet 11 is below its softening point, the microwave energy may break the glass sheet 11. It should also be appreciated that microwave frequencies as low as two gigahertz can be used when the glass sheet 11 is above 900° F. It should be appreciated that the predetermined rate is based on the intensity of the microwave energy and the coupling rate of the glass sheet 11. It should further be appreciated that the ambient temperature of the lehr 10 before the uplift door 28 is approximately 1200° F. and the ambient temperature of the lehr 10 after the uplift door 30 is approximately 1250° F. to maintain the glass sheet 11 at its forming temperature.

When the glass sheet 11 passes beyond the uplift door 30, the method includes forming the glass sheet 11 to a predetermined configuration or curvature. The glass sheet 11 passes through the forming rollers 36a which begin to bend the glass sheet 11 to a large radius curvature and passes through the forming rollers 36b and 36c to bend the glass sheet 11 to achieve smaller radius curvature until reaching the predetermined curvature. The method includes cooling the glass sheet 11 with cool air once the glass sheet 11 exits the lehr 10 to below its softening point as represented by the curve 42 illustrated in FIG. 5.

Accordingly, the method of the present invention provides a way to quickly heat the moving glass sheet 11 by providing a curtain of microwave energy through which the glass sheet 11 is passed inside the lehr 10. The microwave energy is applied based on the size and thickness of the glass sheet 11 to bring the temperature of the glass sheet 11 up to its forming range for the forming process. Further, the method allows the glass sheet 11 to achieve smaller radius by changing from one radius to another by simply employing the proper set of forming rollers 36. The method of the present invention uses the microwave energy curtain to heat the glass sheet 11 and at the same time to cool the outer surface thereof which allows the bending of the glass sheet 11 using a succession of sleeved pinch rollers 36. As illustrated in FIG. 5, the method of the present invention heats the glass sheet 11 to the forming range in less distance/time than conventional radiant heating in a lehr.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method for heating and forming a glass sheet, said method comprising the steps of:

heating a glass sheet to at least a first predetermined temperature;

applying microwave energy to the glass sheet to heat the glass sheet to at least a second predetermined temperature;

cooling an outer surface of the glass sheet to at least a third predetermined temperature; and forming the glass sheet to a predetermined configuration using forming rollers.

2. A method as set forth in claim 1 wherein said step of heating comprises heating a glass sheet to at least the first predetermined temperature using radiant energy.

3. A method as set forth in claim 1 wherein said first predetermined temperature is approximately 900° F. to 950° F.

4. A method as set forth in claim 1 wherein said step of heating comprises heating a glass sheet to at least the first predetermined temperature at a first predetermined rate.

5. A method as set forth in claim 1 wherein said step of applying comprises applying said microwave energy to the glass sheet when the glass sheet has reached at least the first predetermined temperature.

6. A method as set forth in claim 1 wherein said step of applying comprises applying said microwave energy to the glass sheet at a second predetermined rate.

7. A method as set forth in claim 1 wherein said second predetermined temperature is approximately 1150° F. to 1250° F.

8. A method as set forth in claim 1 wherein said step of cooling comprises cooling said outer surface of the glass sheet simultaneously with said step of applying.

9. A method as set forth in claim 1 wherein said third predetermined temperature is approximately 900° F.

10. A method as set forth in claim 1 wherein said step of forming comprises moving the glass sheet through a plurality of said forming rollers to bend the glass sheet to a desired curvature.

11. A method as set forth in claim 1 wherein said step of forming comprises moving the glass sheet through a plurality of said forming rollers, said forming rollers having different radii to bend the glass sheet to a desired curvature.

12. A method for heating and forming a glass sheet, said method comprising the steps of:

heating a glass sheet to at least a first predetermined temperature at a first predetermined rate;

applying microwave energy to the glass sheet to heat the glass sheet to at least a second predetermined temperature;

cooling an outer surface of the glass sheet to at least a third predetermined temperature during said step of applying; and forming the glass sheet to a predetermined configuration using forming rollers.

13. A method as set forth in claim 12 wherein said step of applying comprises applying said microwave energy to the glass sheet when the glass sheet has reached at least the first predetermined temperature.

14. A method as set forth in claim 12 wherein said step of applying comprises applying said microwave energy to the glass sheet at a second predetermined rate.

15. A method as set forth in claim 12 wherein said second predetermined temperature is approximately 1150° F. to 1250° F.

16. A method as set forth in claim 12 wherein said third predetermined temperature is approximately 900° F.

17. A method as set forth in claim 12 wherein said step of forming comprises moving the glass sheet through a plurality of said forming rollers to bend the glass sheet to a desired curvature.

18. A method as set forth in claim 12 wherein said step of forming comprises moving the glass sheet through a plurality of said forming rollers, said forming rollers having different radii to bend the glass sheet to a desired curvature.

19. A method as set forth in claim 12 wherein said step of heating comprises heating a glass sheet to at least the first predetermined temperature using radiant energy.

20. A method for heating and forming a glass sheet, said method comprising the steps of:

heating a glass sheet to at least a first predetermined temperature with radiant energy at a first predetermined rate;

applying microwave energy to the glass sheet at a second predetermined rate to heat the glass sheet to at least a second predetermined temperature;

cooling an outer surface of the glass sheet to at least a third predetermined temperature during said step of applying; and moving the glass sheet through a plurality of forming rollers having different radii to bend the glass sheet to a desired curvature.

* * * * *